United States Patent [19]

Varga

[11] 4,444,020

[45] Apr. 24, 1984

[54] HEAT TRANSFORMATION PROCESS AND APPARATUS FOR AIR-CONDITIONING IN ROOMS FOR A GREAT NUMBER OF LIVING CREATURES, PARTICULARLY BUILDING FOR ANIMAL BREEDING

[75] Inventor: Agnes Varga, Budapest, Hungary

[73] Assignee: Kozponti Valto Es Hitelbank Rt., Budapest, Hungary

[21] Appl. No.: 341,219

[22] Filed: Jan. 21, 1982

[51] Int. Cl.³ .......................... F25B 41/04; A01K 1/00
[52] U.S. Cl. ...................................... 62/93; 62/238.6; 119/16
[58] Field of Search ............................. 119/16, 21, 33; 62/238.6, 93, 176.5

[56] References Cited

U.S. PATENT DOCUMENTS

| | | | |
|---|---|---|---|
| 2,257,734 | 10/1941 | Cornell | 119/21 |
| 2,626,591 | 1/1953 | Mazur et al. | 119/16 |
| 4,175,515 | 11/1979 | Bradley | 119/16 |
| 4,263,785 | 4/1981 | Barniak et al. | 62/79 |
| 4,322,953 | 4/1982 | Remlow et al. | 62/217 |

Primary Examiner—Hugh R. Chamblee
Attorney, Agent, or Firm—Murray Schaffer

[57] ABSTRACT

The invention refers to heat transformation process and apparatus for air-conditioning in rooms for a great number of living creatures, particularly buildings for animal breeding, from which the foul air is let out and the fresh air is let in instead, further the breath produced in condensed at a temperature below dew point.

The essence of the process according to the present invention is that the temperature of the heat quantity that released in the course of condensation is increased, in a manner known per se, to a level higher than that of the room and the part of the heat quantity that released in the course of condensation, not radiated to the environment is let into a heat absorption medium, then it is utilized in a manner known per se.

The essence of the apparatus according to the present invention is that its heat absorber is a thermal pump, preferably the evaporator of a compressor-type cooling circle, and the compressor-type cooling circle comprises an exothermic unit, preferably a condenser.

10 Claims, 1 Drawing Figure

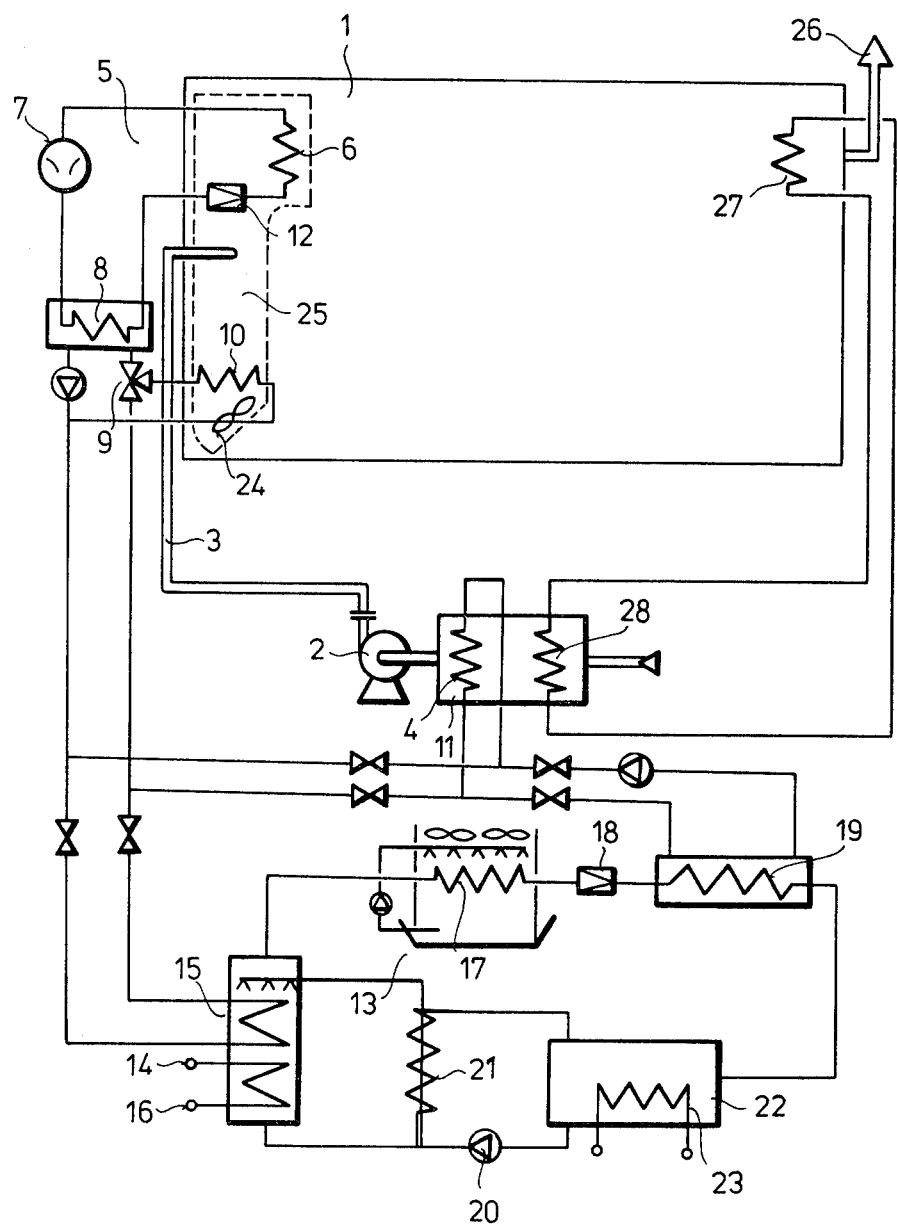

HEAT TRANSFORMATION PROCESS AND APPARATUS FOR AIR-CONDITIONING IN ROOMS FOR A GREAT NUMBER OF LIVING CREATURES, PARTICULARLY BUILDING FOR ANIMAL BREEDING

The invention refers to heat transformation process and apparatus for air-conditioning in rooms for a great number of living creatures, particularly buildings for animal breeding from which the foul air is let out and the fresh air is let in instead, further the breath produced is condensed at a temperature below dew point.

There are apparatuses—such as in HU-PS No. 174.791—known, according to which a greater part of the breath of large amount porduced in the buildings for animal breeding is exhausted not by ventilation, but by condensation and the heat obtained in such way is utilized for heating in winter and for cooling in summer. By the heat to be obtained by condensation—due to its low temperature—only the external, cold fresh air can be pre-heated; the transmission heat loss of the room cannot be recovered. As the heat produced by the living creatures—in case of this known apparatus—does not ensure the thermal equilibrium of the building, the heat quantity still required is to be recovered by some traditional heating apparatus. In summer, the cooling apparatus operating by thermal energy can utilize, only in a small extent, the heat quantity obtained by condensation, therefore, the economic result to be achieved is not effective enough.

The invention is based on the recognition that in case the heat amount obtained by condensation is increased to a considerably higher level from the initial low temperature by means of a cooling compressor, the heat quantity obtained can be utilized by far higher effectiveness for heating the fresh air or the air of the room in winter, while in summer for heating a cooling apparatus operated by thermal energy.

The essence of the process according to the present invention is that the temperature of the heat quantity that released in the course of condensation is increased, in a manner known per se, to a level higher than that of the room and the part of the heat quantity that released in the course of condensation, not radiated to the environment is let into heat absorption medium, then it is utilized in a manner known per se.

The essence of the apparatus according to the present invention is that its heat absorber is a thermal pump, preferably the evaporator of a compressor-type cooling circle, and the compressor-type cooling circle comprises an exothermic unit, preferably a condenser.

The apparatus according to the present invention is described in details by the example in the FIGURE. The FIGURE illustrates the schematic diagram of the apparatus according to the invention.

In 1 room for a great number of living creatures, preferably for animals, 2 ventilator supplies fresh air through 3 air duct. 2 ventilator is preferably of variable speed so that the fresh air supply should be variable in case the number of living creatures in the room changes.

The fresh air gets—pre-heated in winter and cooled in summer—through 4 fresh air system into 1 room through 3 air duct.

The surface of a temperature below dew point required for condensation is provided for by the heat absorption unit of 5 compressor-type cooling circle, preferably by 6 evaporator. 7 compressor of 5 compressor-type cooling circle increases the temperature of the heat quantity obtained by condensation to a higher level and the heat quantity of higher temperature obtained in such way is transmitted by the exothermic unit arranged also in 5 compressor-type cooling circle, preferably by 8 condenser, to the heat absorption medium, which is preferably water. By absorbing the heat amount, the water gets heated up and flows—through a governor valve, preferably 9 two-way valve—on the one hand into 10 air heater suitable for the direct heating of 1 room, and on the other hand it can be utilized for pre-heating fresh air, through 11 pre-heater of 4 fresh air system. In 5 compressor-type cooling circle the heat absorption medium is refrigerant and the cooling cycle is closed through 12 throttle.

In summer, when no heating is required, on the contrary, the air is to be cooled, the heat quantity absorbed by 5 compressor-type cooling circle gets into 14 generator of 13 absorption cooling apparatus and it pre-heats the strong solution through 15 heat exchanger. In addition to 15 heat exchanger if necessary—further generation of the absorbed refigerant is provided for by a second 16 heat exchanger, by ensuring external energy. The generated refrigerant gets condensed in 17 evaporative condenser, preferably in condenser of evaporation system and gets through 18 throttle, into 19 water-cooled evaporator. refrigerant and absorbs the weak solution and returns the strong solution produced in such way, by means of 20 solution pump, through 21 rich solution weak solution heat exchanger into 15 heat exchanger, in which the cycle starts again. 23 heat exchanger in 22 absorber arranged between 19 water cooled evaporator and 20 solution pump serves to exhaust the solution heat.

Should the heating demand be low, e.g. in the transition period, 5 compressor-type coling circle absorbs only such a heat quantity which is required for exhausting the breath developing. Should this heat not be utilized either for heating or for cooling, the cooling water of 8 condenser is let into 17 evaporative condenser, operating in such case as a water recooler.

In a preferred embodiment, 6 evaporator and 10 air heater are arranged in 25 air-circulation unit provided with common 24 ventilator.

From 1 room the foul air gets out through 26 outlet. before 26 outlet there is 27 efficiency improvement unit arranged, which is practically a heat exchanger connected to 28 heat exchanger of 4 fresh air system. The heat amount absorbed by 27 efficiency improvement unit may improve—through 28 heat exchanger—the efficiency of pre-heating the inhausted fresh air.

I claim:

1. A process for maintaining the environment of a room housing a large number of animals wherein the foul air is continuously replaced with fresh air, comprising the steps of providing a medium at a temperature below the dew point of said room to condense the humidity in said room, thereafter compressing said medium to raise the temperature thereof to a level greater than the temperature in the room, subsequently condensing said compressed medium to release the heat therein, radiating a portion of said released heat directly to the environment within said room and passing a portion of said released heat selectively to one of a heat exchanger for pre-heating the fresh air and a heat exchanger comprising the heating portion of a refrigeration circuit to pre-cool said fresh air.

2. The process according to claim 1 including the step of releasing said radiated heat directly into said room.

3. The process according to claim 2 including the step of providing an additional source of heat to said refrigeration circuit.

4. Apparatus for maintaining the environment of a room housing a large number of animals wherein the foul air is continuously replaced with fresh air, comprising a closed thermal pump circuit comprising an evaporator having a medium at a temperature below the dew point of said room to condense the humidity in said room, a compressor for compressing said medium subsequent to the removal of the humidity therefrom to raise the temperature thereof to a level greater than the temperature in the room, a condensor for condensing said compressed medium to release the heat therein, means for radiating a portion of said released heat to the room and means for passing the remainder portion of said released heat selectively to one of a heat exchanger for pre-heating the fresh air and a heat exchanger forming the heating portion of a refrigeration circuit to pre-cool said fresh air.

5. The apparatus according to claim 4, wherein the medium of said evaporator is refigerant, and said condensor has a water medium into which said heat is released.

6. The apparatus according to claim 5, including a two-way valve, interposed between said water medium and the heat exchanges for preheating said fresh air for passing a portion thereof directly to an air heater into said room.

7. The apparatus according to claim 6, wherein evaporator and air heater are arranged in common air-circulation system provided with common ventilator fan.

8. Apparatus according to claim 4 wherein the heat exchanger of refrigeration circuit is an evaporator of an absorption cooling device.

9. The apparatus according to claim 8, wherein the evaporator of said absorption cooling device comprises heat exchanger having means for introducing external heat thereto.

10. The apparatus according to claim 9, wherein heat absorption side of absorption cooling device is connected to the fresh-air system.

* * * * *